United States Patent Office
3,009,927
Patented Nov. 21, 1961

3,009,927
9,11-HALOGENATED PROGESTERONES
Hans Reimann, Bloomfield, and David H. Gould, Leonia, N.J., assignors to Schering Corporation, Bloomfield, N.J., a corporation of New Jersey
No Drawing. Filed May 29, 1961, Ser. No. 113,088
21 Claims. (Cl. 260—397.3)

This invention relates to novel and therapeutically useful halogenated steroids and to methods for their manufacture. In particular, this invention relates to $9\alpha,11\beta$-dihalogenated derivatives of progesterone and analogs thereof, which exhibit valuable progestational properties.

Our novel compounds may be represented by the following formula:

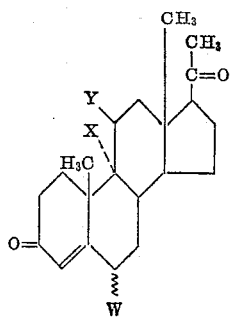

wherein W is a member of the group consisting of methyl and hydrogen, X is a halogen having an atomic weight greater than 19; Y is a halogen having an atomic weight less than 126 and being at least as electronegative as X; and the 1-dehydro and 19-nor analogs thereof. These novel compounds are thus 9,11-dihalogenated analogs and 6-methyl-9-11-dihalogenated analogs of progesterone, 19-nor-progesterone and 1-dehydroprogesterone. In the above formula it is to be understood that the bond designated by a wavy line ($\sim$) indicates that the substituent at the 6-carbon includes both the $\alpha$- and $\beta$-epimers. In naming the class without specifying configuration, both epimers are intended. Thus a term such as 6-methyl-9,11-dihalogenprogesterone includes both the $6\alpha$- and $6\beta$-methyl epimers.

In the above formula, the halogen at C–11 must be at least as electronegative as the halogen present in the $9\alpha$-position (fluorine being the most electronegative halogen, and iodine the least electronegative) and further cannot be iodo. Thus, a progesterone of our invention containing a $9\alpha$-chloro group may possess and $11\beta$-chloro or an $11\beta$-fluoro group, but cannot contain an $11\beta$-iodo or $11\beta$-bromo group. This artificial restriction as to the electro-negativity of the 9 and 11 substituents is necessarily imposed in view of the limitation of the manufacturing process developed below.

Typical progestins embraced by the general formula are $9\alpha,11\beta$-dichloroprogesterone, $9\alpha,11\beta$-dibromoprogesterone, $9\alpha$-chloro-$11\beta$-fluoroprogesterone, $9\alpha$-bromo-$11\beta$-chloroprogesterone, $9\alpha$-bromo - $11\beta$ - fluoroprogesterone, 6 ($\alpha$ and $\beta$)-methyl - $9\alpha,11\beta$ - dichloroprogesterone, 6($\alpha$ and $\beta$)-methyl-$9\alpha$-bromo-$11\beta$-fluoroprogesterone, and the like also including, and their 19-nor and $\Delta^1$-dehydro analogs. Although the compounds of our invention, in general, are valuable progestins, the preferred species are $9\alpha$-$11\beta$-dichloroprogesterone, $9\alpha,11\beta$-dichloro-19-norprogesterone, and $6\alpha$-methyl-$9\alpha,11\beta$ dichloroprogesterone.

Our novel compounds are prepared by reacting 4,9(11)-pregnadiene-3,20-dione (or 1,4,9(11)-pregnatriene-3,20-dione or 19-nor-4,9(11)-pregnadiene-3,20-dione) or their 6-methyl analogs with a suitable halogenating agent. The starting materials necessarily possess a $\Delta^{9(11)}$-bond; and in the case of 4,9(11)-pregnadiene-3,20-dione, its preparation is described in the literature. The other aforementioned starting substances are prepared by a combination of processes analogous to those described in the literature. For example, 1,4,9(11)-pregnatriene-3,20-dione (1,9(11)-bisdehydroprogesterone) is prepared from 4,9(11)-pregnadiene-3,20-dione by microbiological dehydrogenation with an organism such as, for example, *Corynebacterium simplex* (A.T.C.C. 6946) in a manner similar to that described in U.S. Patent No. 2,837,464, or by chemical dehydrogenation through the use of such reagents as chloranil or selenium dioxide. For example, 19-nor-4,9(11)-pregnadiene-3,20-dione (9(11)-dehydro-19-norprogesterone) is prepared from $11\alpha$-hydroxy-19-norprogesterone or $11\beta$-hydroxy-19-norprogesterone by dehydration as effected by reagents such as methanesulfonyl chloride in the presence of pyridine or phosphorous oxychloride in pyridine. In similar manner, 1,4,9(11)-pregnatriene-3,20-dione (prepared as described hereinafter) may also be prepared from the corresponding 11-hydroxy-1,4-pregnadiene-3,20-dione.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl-N,N-dibromohydantion, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic)

such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable nonreacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, each one of our novel compounds may be prepared by any one of several methods. For example, $9\alpha,11\beta$-dichloroprogesterone may be prepared from 9(11)-dehydroprogesterone by utilizing such reagents and combinations as: (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

A 6-substituted-$9\alpha,11\beta$-dihalogeno-1-dehydroprogesterone falling under the general formula such for example, $6\alpha$-methyl-$9\alpha,11\beta$-dichloro-1-dehydroprogesterone may be similarly prepared from $6\alpha$-methyl 1,9(11)-bis-dehydroprogesterone by utilizing any one of the above reagents or by chemical or microbiological dehydrogenation techniques as heretofore described.

Our process, whereby a 9(11)-dehydroprogesterone or 6-substituted-9(11)-dehydroprogesterone is converted to a $9\alpha,11\beta$-dihalogeno derivative is generally carried out in the presence of a non-reacting solvent at temperatures ranging from 5° C. to 50° C. with reaction times varying from one-half to 24 hours, depending on the reagents involved. It is preferred that the halogen cation source be preferably present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide as well as suitable mixtures of these solvents.

Further, when carrying out the above described process in a haolgenated hydrocarbon solvent such as methylene chloride, chloroform or carbon tetrachloride, the yield and purity of the dihalogenated progesterone obtained is greatly increased by adding pyridine to the reaction mixture. Preferably from one to five equivalents of pyridine is added, based on the amount of steroid being converted. Other organic basic agents which may also be used in conjunction with a halogenated hydrocarbon solvent are aromatic tertiary amines such as lutidine, collidine, alkyl substituted pyridines, and the like. The reaction is usually carried out initially at −20° C. with subsequent warming to about room temperature. The reaction time may be as short as five minutes or as long as one hour. In general, the optimum reaction time is about fifteen minutes.

Our process whereby a 6-substituted-9(11)-dehydroprogesterone is converted to a 6-substituted-$9\alpha,11\beta$-dihalogenoprogesterone is also applicable to 6-substituted-9(11)-dehydro-19-norprogesterones. With the aforementioned 9(11)-dehydro-19-norprogesterones there are produced the novel progestational agents, 6-W-$9\alpha$-X-$11\beta$-Y-19-norprogesterones wherein W, X and Y are as heretofore described. Thus, 6-methyl-4,9(11)-19-norpregnadiene-3,20-diones (6-methyl-9(11)-dehydro-19-norprogesterones) when reacted with chlorine in carbon tetrachloride in the presence of pyridine, for example, are converted to their respective $9\alpha,11\beta$-dichloro derivatives. The necessary intermediates, i.e. the 6-substituted-9(11)-dehydro-19-norprogesterones are prepared by using procedures analogous to those known in the art. 19-norprogesterone is treated with ethylene glycol by known procedures to form the 3,20-bisethylene ketal derivative which, in turn, is expoxidized on treatment with, for example, monoperphthalic acid to give $5\alpha,6\alpha$-epoxy-19-norpregnane-3,20-dione 3,20-bisethylene ketal. From this epoxy intermediate the 6-methyl substituent is introduced into the 19-norpregnane nucleus, using techniques described in the literature. Thus, addition of a Grignard reagent such as methyl magnesium iodide with subsequent acid hydrolysis yields $5\alpha$-hydroxy-$6\beta$-methyl-19-norpregnane-3,20-dione. A reagent such as ethanolic hydrochloric acid acting on $5\alpha$-hydroxy-$6\beta$-substituted-19-norpregnanes simultaneously dehydrates the hydroxy group and epimerizes the $6\beta$-constituent to yield, $6\alpha$-methyl-19-norprogesterone. In order to obtain a 6-substituent in the $\beta$-position, a $5\alpha$-hydroxy-$6\beta$-substituted intermediate such as $5\alpha$-hydroxy-$6\beta$-methyl-19-norpregnane-3,20-dione is treated with, for example, thionyl chloride in a cold basic medium such as pyridine to give $6\beta$-methyl-19-norprogesterone. The double bond between C–9 and C–11 is then introduced into the 6-substituted-19-norprogesterone via the $11\beta$-hydroxy derivative using procedures outlined heretofore to give the necessary intermediates, $6\alpha$-methyl-9(11)-dehydro-19-norprogesterone and $6\beta$-methyl-9(11)-dehydro-19-norprogesterone.

Our novel dihalogenated progesterones, their 1-dehydro and their 19-nor analogs are active progestational agents by both oral and intramuscular routes, being specific in their action and devoid of androgenic, estrogenic or corticoid activity. That our compounds have progestational activity at all is surprising in view of the art which teaches that the introduction of substituents into the C-ring of progesterone and its derivatives, such as for example, $11\beta$-hydroxylprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solution or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and mild production by regulating the cycle of chickens and cows by the administration of our progestational agents.

The following examples are illustrative of the procedures employed in preparing the compounds of this invention, but are not to be construed as limiting the scope thereof; the scope of our invention being limited only by the appended claims.

EXAMPLE 1

9α,11β-dichloroprogesterone

A solution of 1 g. of 4,9(11)-pregnadiene-3,20-dione and 4.0 g. of lithium chloride in 50 ml. of glacial acetic acid is cooled to about 10° C. and there is added 250 mg. of hydrogen chloride in 1 ml. of tetrahydrofuran followed by 500 mg. of 93% N-chlorosuccinimide. The solution is stirred at room temperature for 20 minutes in the absence of light, and then is poured into ice-water stirring. A yellow precipitate forms which is filtered, washed with water, triturated with ether and crystallized from acetone-hexane to give 9α,11β-dichloroprogesterone. When recrystallized again from acetone-hexane, 9α,11β-dichloroprogesterone has a M.P. 174–177° C. dec. $[\alpha]_D$+243° (chloroform).

Alternatively, the compound of this example is prepared by adding a solution of 251 mg. of chlorine in 36 ml. of acetic acid to a mixture of 1.003 g. of 4,9(11)-pregnadiene-3,20-dione and 4.0 g. of lithium chloride in 4 ml. of glacial acetic acid. The mixture is stirred at room temperature for 3 hours, then poured into ice-water with stirring. A solid product precipitates which is filtered, washed with water, triturated with ether, and is crystallized from acetone-hexane to give 9α,11β-dichloroprogesterone.

A second alternative for the preparation of the compound of this example is by reacting 1.0 g. of 4,9(11)-pregnadiene-3,20-dione dissolved in 30 ml. of carbon tetrachloride with 2.1 ml. of a solution of chlorine in carbon tetrachloride (111 mg./ml.) in the presence of 0.75 ml. of pyridine at −20° C. The mixture is stirred at −20° C. for 15 minutes, then allowed to warm to room temperature over a period of a half hour. The solution is filtered and the filtrate concentrated in vacuo to an oily residue. Trituration of this residue with ether yields solid material which is crystallized from acetone-hexane to give 9α,11β-dichloroprogesterone.

EXAMPLE 2

9α-bromo-11β-chloroprogesterone

To a solution of 1.005 g. of 4,9(11)-pregnadiene-3,20-dione and 4.0 g. of lithium chloride in 50 ml. of glacial acetic acid there is added 490 mg. of N-bromoacetamide. The mixture is stirred at room temperature and a slow stream of gaseous hydrogen chloride is passed over the surface until the solution begins to darken (10–30 seconds). The hydrogen chloride gas is removed and the solution is stirred in the dark at room temperature for about 10 minutes. The solution is poured into ice-water with stirring and the resultant solid is filtered, washed with water, and crystallized from methylene chloride-pentane to give 9α-bromo-11β-chloroprogesterone, M.P. 111–113° C. dec. $[\alpha]_D$=+226° (chloroform).

EXAMPLE 3

9α-bromo-11β-fluoroprogesterone

To a solution of 1 g. of 4,9(11)-pregnadiene-3,20-dione and 483 mg. of N-bromoacetamide in 30 ml. of acetic acid is added a solution of about 500 mg. of hydrogen fluoride in 20 ml. of acetic acid. The solution is stirred at room temperature for 2 hours, then poured into ice-water with stirring. A resinous precipitate forms from which the aqueous solution is decanted. The precipitate is then dissolved in acetone-ether and filtered through a column of Florisil in ether. The eluted material is combined, the ether removed in vacuo, and the resultant residue is triturated with pentane-ether, then crystallized from methylenechloride-pentane to give 9α-bromo-11β-fluoroprogesterone, M.P. 145–150° C. dec. $[\alpha]_D$=+170° (chloroform).

Alternatively, to a solution of 1 g. of 4,9(11)-pregnadiene-3,20-dione in 50 ml. of diethylacetic acid there is added a solution of 1.2 g. of hydrogen fluoride in 5 ml. of a chloroform-tetrahydrofuran mixture, followed by 485 mg. of 95% N-bromoacetamide. The solution is stirred at room temperature for 1½ hours, poured into potassium carbonate solution with vigorous stirring, and then is extracted with methylene chloride. The organic extracts are combined, washed with 5% sodium hydroxide and water, dried over magnesium sulfate, filtered and concentrated to a residue. Pentane is added to the residue, and the resulting product is filtered and recrystallized from methylene chloride-pentane to give 9α-bromo-11β-fluoroprogesterone.

EXAMPLE 4

1,4,9(11)-pregnatriene-3,20-dione

Five grams of 4,9(11)-pregnadiene-3,20-dione is fermented with Corynebacterium simplex (A.T.C.C. 6946) according to the procedure of U.S. Patent No. 2,837,464 as follows.

A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of Corynebacterium simplex (A.T.C.C. 6946). The flask is incubated at 28° C. for 24 hours. A second 300 ml. Erlenmeyer flask containing 150 mg. of sterile 4,9(11)-pregnadiene-3,20-dione in 5.0 ml. acetone is inoculated with the 24 hour culture of Corynebacterium simplex (A.T.C.C. 6946). The culture-containing steroid solution is incubated for 48 hours at 28° to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 1,4,9(11)-pregnatriene-3,20-dione, M.P. 135–138° C., 147–150° C. (double M.P.)

$\lambda_{max.}^{MeOH}$ 240 mμ

$\epsilon$=15,500, $[\alpha]_D$+75° (chloroform).

Analysis.—Calc'd for $C_{21}H_{26}O_2$: C, 81.25; H, 8.44. Found: C, 81.24; H, 8.52.

EXAMPLE 5

9α-iodo-11β-chloroprogesterone

To a solution of 1 g. of 4,9(11)-pregnadiene-3,20-dione in 40 ml. of tetrahydrofuran which is chilled to 0° C., there is added 3 drops of perchloric acid and 3 g. of lithium chloride followed by the dropwise addition of a solution of 520 mg. of iodine monochloride in 5 ml. of tetrahydrofuran. The reaction mixture is stirred at room temperature for five hours then poured into ice water. A gummy precipitate forms which is dissolved in methylene chloride. The methylene chloride solution is filtered through a column of Florisil in ether. The eluate is concentrated in vacuo at room temperature to a residue which is triturated with ether. The resultant solid product is filtered and crystallized twice from pentane-methylene chloride to give 9α-iodo-11β-chloroprogesterone, $$\lambda_{max.}^{MeOH} \text{ 243 m}\mu$$

EXAMPLE 6

9α,11β-dibromoprogesterone

To a solution of 1 g. of 4,9(11)-pregnadiene-3,20-dione and 4 g. of lithium bromide in 50 ml. of acetic acid there is added 485 mg. of N-bromoacetamide followed by a solution of 270 mg. of hydrogen bromide in 4.3 ml. of acetic acid. The mixture is stirred at room temperature for one hour, then is poured into ice water. A solid forms which is filtered, washed with water, then recrystallized twice from acetone-hexane to give 9α,11β-dibromoprogesterone, $$\lambda_{max.}^{MeOH} \text{ 241 m}\mu$$

EXAMPLE 7

9α-iodo-11β-fluoroprogesterone

To a solution of 500 mg. of 4,9(11)-pregnadiene-3,20-dione and 3 g. of potassium fluoride in 40 ml. of dimethylsulfoxide, there is added 300 mg. of N-iodosuccinimide. The reaction mixture is stirred at room temperature for 16 hours, poured into ice water and extracted with methylene chloride. The organic extracts are then treated with decolorizing carbon and concentrated in vacuo. The resultant residue is chromatographed on silica gel. The fraction eluted with 50% of ether-hexane yields 9α-iodo-11β-fluoroprogesterone, $$\lambda_{max.}^{MeOH} \text{ 242 m}\mu$$

EXAMPLE 8

9α-chloro-11β-fluoroprogesterone

To a solution of 500 mg. of 4,9(11)-pregnadiene-3,20-dione in 25 ml. of diethyl acetic acid there is added 240 mg. of N-chlorosuccinimide followed by a solution of 620 mg. of hydrogen fluoride in 3.2 ml. of a mixture of tetrahydrofuran and chloroform. The reaction mixture is stirred at room temperature for 48 hours, then is poured into an aqueous sodium carbonate solution. The mixture is extracted with methylene chloride. The organic extracts are combined and evaporated to a residue which is chromatographed on silica gel. The product eluted with 20% ether in hexane is crystallized with acetone-hexane to give 9α-chloro-11β-fluoroprogesterone, $$\lambda_{max.}^{MeOH} \text{ 238 m}\mu$$

EXAMPLE 9

9α,11β-dichloro-1,4-pregnadiene-3,20 dione

A solution of 1.0 g. of 1,4,9(11)-pregnatriene-3,20-dione (the compound of Example 4) in 40 ml. of acetic acid is reacted with 490 mg. of 95% N-chlorosuccinimide in the presence of hydrogen chloride and lithium chloride according to the procedure of Example 1. The water-precipitated product is crystallized from acetone-hexane to give 9α,11β-dichloro-1,4-pregnadiene-3,20-dione.

Alternatively, the compound of this example is prepared from 9α,11β-dichloroprogesterone (the compound of Example 1) with the aid of a culture of Corynebacterium simplex in the manner described in Example 4, to give 9α,11β-dichloro-1,4-pregnadiene-3,20-dione, M.P. 198–208° C., dec.

$$\lambda_{max.}^{MeOH} \text{ 237 m}\mu$$

$\epsilon=15,000$; $[\alpha]_D +184°$ (chloroform).

EXAMPLE 10

9α,11β-dibromo-1,4-pregnadiene-3,20-dione

To a solution of 1.0 g. of 1,4,9(11)-pregnatriene-3,20-dione (the compound of Example 4) and 4.0 g. of lithium bromide in 50 ml. of acetic acid there is added 485 mg. of N-bromoacetamide, followed by a solution of 270 mg. of hydrogen bromide in 4.3 ml. of acetic acid. The mixture is stirred at room temperature for one hour, then poured into ice-water. A solid precipitates, which is filtered, washed with water and crystallized twice from acetone-hexane to give 9α,11β-dibromo-1,4-pregnadiene-3,20-dione, $$\lambda_{max.}^{MeOH} \text{ 240 m}\mu$$

Alternatively, 9α,11β-diobromoprogesterone (the compound of Example 6) is subjected to the action of a culture of Corynebacterium simplex in the manner described in Example 4 to give 9α,11β-dibromo-1,4-pregnadiene-3,20-dione.

EXAMPLE 11

9α-chloro-11β-fluoro-1,4-pregnadiene-3,20-dione

To a solution of 500 mg. of 1,4,9(11)-pregnatriene-3,20-dione (the compound of Example 4) in 20 ml. of carbon tetrachloride and 3 ml. of pyridine, there is added a solution of 860 mg. of hydrogen fluoride in 1.5 ml. of a mixture of tetrahydrofuran and chloroform followed by 230 mg. of N-chlorosuccinimide. The reaction mixture is diluted with sufficient methylene chloride to give a solution and is stirred for 48 hours at room temperature, then poured into aqueous sodium carbonate. The crude mixture is extracted with methylene chloride, the organic extracts combined, washed with water, dilute hydrochloric acid and finally with water. The solution is then dried over magnesium sulfate, filtered and evaporated to a residue which is triturated with ether, filtered and crystallized from acetone-hexane to give 9α-chloro-11β-fluoro-1,4-pregnadiene-3,20-dione, M.P. 215–220° C;

$$\lambda_{max.}^{MeOH} \text{ 236 m}\mu$$

$\epsilon=15,100$; $[\alpha]_D +141°$ (chloroform).

*Analysis.*—Calcd. for $C_{21}H_{26}O_2ClF$: F. 5.21. Found: F 5.57.

Alternatively, 9α-chloro-11β-fluoroprogesterone (the compound of Example 8) is subjected to the action of a culture of Corynebacterium simplex in the manner described in Example 4 to give 9α-chloro-11β-fluoro-1,4-pregnadiene-3,20-dione.

EXAMPLE 12

9α-bromo-11β-chloro-1,4-pregnadiene-3,20-dione 1,4,9(11)-pregnatriene-3,20-dione (the compound of Example 4) is reacted with lithium chloride, N-bromoacetamide and gaseous hydrogen chloride in the manner of Example 2. The resultant product is isolated and purified in the described manner to give 9α-bromo-11β-chloro-1,4-pregnadiene-3,20-dione.

Alternatively, 9α-bromo-11β-chloro-progesterone (the compound of Example 2) is subjected to the action of a culture of Corynebacterium simplex in the manner described in Example 4 to give 9α-bromo-11β-chloro-1,4-pregnadiene-3,20-dione, $$\lambda_{max.}^{MeOH} \text{ 240 m}\mu$$

EXAMPLE 13

9α-bromo-11β-fluoro-1,4-pregnadiene-3,20-dione 1,4,9(11)-pregnatriene-3,20-dione (the compound of Example 4) is reacted with a bromoacetamide and hydrogen fluoride in acetic acid in the manner of Example 3 to give 9α-bromo-11β-fluoro-1,4 - pregnadiene-3,20 - dione, $$\lambda_{max.}^{MeOH} \text{ 240 m}\mu$$

Alternatively, 9α-bromo-11β-fluoroprogesterone (the compound of Example 3) is subjected to the action of a culture of Corynebacterium simplex in the manner described in Example 4 to give 9α-bromo-11β-fluoro-1,4-pregnadiene-3,20-dione.

EXAMPLE 14

*9α-iodo-11β-chloro-1,4-pregnadiene-3,20-dione*

1,4,9(11)-pregnatriene-3,20-dione (the compound of Example 4) is reacted with lithium chloride and iodine monochloride in the manner described in Example 5 to give 9α-iodo-11β-chloro-1,4-pregnadiene-3,20-dione.

Alternatively, 9α-iodo-11β-chloroprogesterone (the compound of Example 5) is subjected to the action of a culture of *Corynebacterium simplex* in the manner described in Example 4 to give 9α-iodo-11β-chloro-1,4-pregnadiene-3,20-dione.

EXAMPLE 15

*9α-iodo-11β-fluoro-1,4-pregnadiene-3,20-dione*

1,4,9(11)-pregnatriene-3,20-dione (the compound of Example 4) is reacted with potassium fluoride and N-iodosuccinimide in the manner described in Example 7 to give 9α-iodo-11β-fluoro-1,4-pregnadiene-3,20-dione.

Alternatively, 9α-iodo-11β-fluoroprogesterone (the compound of Example 7) is subjected to the action of a culture of *Corynebacteruim simplex* in the manner described in Example 4 to give 9α-iodo-11β-fluoro-1,4-pregnadiene-3,20-dione.

EXAMPLE 16

*9α-iodo-11β-bromoprogesterone*

To a solution of 1.0 g. of 4,9(11)-pregnadiene-3,20-dione and 4.0 g. of lithium bromide in 50 ml. of acetic acid there is added 720 mg. of N-iodosuccinimide, followed by a solution of hydrogen bromide in 4.5 ml. of acetic acid. The mixture is stirred at room temperature for one hour, then poured into ice-water. The solid which precipitates is chromatographed on silica gel, and eluted with 15% ether in hexane. The eluates are combined and concentrated to a residue which is crystallized from acetone-hexane to give 9α-iodo-11β-bromoprogesterone.

EXAMPLE 17

*19-nor-4,9(11)-pregnadiene-3,20-dione*

A solution of 2 g. of 11β-hydroxy-19-nor-4-pregnene-3,20-dione in 10 ml. of dimethylformamide and 2 ml. of pyridine is chilled to 0° C. A solution of 1.0 g. of methane-sulfonyl chloride in 10 ml. of dimethylformamide is added dropwise. The reaction mixture is stirred at room temperature for 24 hours, and then is poured into ice-water. A solid precipitate forms which is filtered, washed with water, and crystallized from acetone-hexane to give 19-nor-4,9(11)-pregnadiene-3,20-dione, $\lambda_{max.}^{MeOH}$ 240 mμ

EXAMPLE 18

*9α,11β-dichloro-19-norprogesterone*

A solution of 19-nor-4,9(11)-pregnadiene-3,20-dione (500 mg.), the compound of Example 17, in 20 ml. of carbon tetrachloride containing 0.4 ml. of pyridine is chilled to −20° C. and there is added a solution of 120 mg. of chlorine gas dissolved in 2.3 ml. of carbon tetrachloride. The mixture is stirred at −20° C. for 30 minutes, then diluted with methylene chloride and washed first with 5% hydrochloric acid, then with 5% sodium bicarbonate and finally with water. The solution is dried over magnesium sulfate, concentrated in vacuo to a residue which is crystallized from acetone-hexane to give 9α,11β-dichloro-19-norprogesterone, $\lambda_{max.}^{MeOH}$ 238 mμ

EXAMPLE 19

*9α-bromo-11β-chloro-19-norprogesterone*

To a solution of 230 mg. of N-bromoacetamide and 2.0 g. of lithium chloride in 20 ml. of glacial acetic acid there is added 500 mg. of 19-nor-4,9(11)-pregnadiene-3,20-dione, the compound of Example 17. The mixture is stirred at room temperature for about 30 minutes, then poured into ice-water. A solid results, which is filtered, washed well with water, and crystallized twice from methylene chloride-pentane to give 9α-bromo-11β-chloro-19-norprogesterone.

EXAMPLE 20

*9α-bromo-11β-fluoro-19-norprogesterone*

A solution of 250 mg. of 19-nor-4,9(11)-pregnadiene-3,20-dione, the compound of Example 17, and 115 mg. of N-bromoacetamide in 15 ml. of diethylacetic acid is reacted with a solution of 250 mg. of hydrogen fluoride in 2 ml. of a chloroform-tetrahydrofuran mixture in the manner described in Example 3. The resultant product is isolated in the described manner and crystallized from methylene chloride-hexane three times to give 9α-bromo-11β-fluoro-19-norprogesterone.

EXAMPLE 21

*9α-iodo-11β-chloro-19-norprogesterone*

19-nor-4,9(11)-pregnadiene-3,20-dione, the compound of Example 17, is reacted with iodine monochloride and lithium chloride in tetrahydrofuran in the manner of Example 5 to give 9α-iodo-11β-chloro-19-norprogesterone.

EXAMPLE 22

*9α,11β-dibromo-19-norprogesterone*

To 500 mg. of 19-nor-4,9(11)-pregnadiene-3,20-dione, the compound of Example 17, dissolved in 30 ml. of carbon tetrachloride there is added 0.5 ml. of pyridine. The solution is chilled to −20° C. and there is added a solution of 270 mg. of bromine in 5 ml. of carbon tetrachloride. The reaction mixture is stirred at −20° C. for 30 minutes, then diluted with methylene chloride and washed with 5% hydrochloric acid, 5% aqueous sodium bicarbonate and, finally with water. The solution is dried over magnesium sulfate, filtered, and concentrated in vacuo. The resultant residue, dissolved in 5 ml. of methylene chloride is placed on a column of silica gel in ether. The column is eluted with ether. The eluates are combined and concentrated to a residue which is crystallized from methylene chloride-pentane to give 9α,11β-dibromo-19-norprogesterone.

EXAMPLE 23

*9α,11β-dichloroprogesterone*

One gram of 4,9(11)-pregnadiene-3,20-dione and 1 g. of iodobenzene dichloride are dissolved in 20 ml. of methylene chloride. The solution is stirred for 5 hours at room temperature, then concentrated in vacuo to a residue which is crystallized from acetone-hexane to give 9α,11β-dichloroprogesterone.

EXAMPLE 24

*6β-methyl-4,9(11)-pregnadiene-3,20-dione*

(A) 6β-METHYL-11β-HYDROXYLPROGESTERONE

A living culture of the organism *Curvularia lunata* (N.R.R.L. 2380) is rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide | |

100 ml. of this medium is placed in each of several 300 ml. flasks. To each flask is added 50 mg. of 6β-methylprogesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 6β-methyl-11β-hydroxyprogesterone.

(B) 6β-METHYL-4,9(11)-PREGNADIENE-3,20-DIONE

A solution of 3 g. of 6β-methyl-11β-hydroxyprogesterone (the compound of Example 24A) in a mixture of 20 ml. of dimethylformamide and 5 ml. of dry pyridine is chilled in an ice-bath and then there is added dropwise a solution of 3.2 g. of methanesulfonyl chloride in 30 ml. of dimethylformamide. Stirring is continued at room temperature for 28 hours, after which the mixture is poured into ice-water. A precipitate forms which is filtered, washed with water and crystallized from acetone-hexane to give 6β-methyl-4,9(11)pregnadiene-3,20-dione.

EXAMPLE 25

6β-methyl-9α,11β-dichloroprogesterone

To one gram of 6β-methyl-4,9(11)-pregnadiene-3,20-dione (the compound of Example 24) dissolved in 30 ml. of carbon tetrachloride at −20° C. is added a solution of 220 mg. of chlorine in 3 ml. of carbon tetrachloride and 0.65 ml. of pyridine. The mixture is stirred at −20° C. for 15 minutes, then allowed to warm to room temperature over a period of ½ hour. The solution is filtered and the filtrate concentrated in vacuo to a residue which is triturated with ether. A solid separates which is filtered and crystallized from acetone-hexane to give 6β-methyl-9α,11β-dichloroprogesterone.

EXAMPLE 26

6β-methyl-9α-chloro-11β-fluoroprogesterone

To 500 mg. of 6β-methyl-4,9(11)-pregnadiene-3,20-dione (the compound of Example 24) in 25 ml. of diethylacetic acid, there is added 215 mg. of N-chlorosuccinimide followed by a solution of 620 mg. of hydrogen fluoride in 3.2 ml. of a mixture of tetrahydrofuran and chloroform. The reaction mixture is stirred at room temperature for 48 hours, then is poured into an aqueous sodium carbonate solution. The mixture is extracted with methylene chloride. The organic extracts are combined and evaporated to a residue which is chromatographed on silica gel. The product eluted with 25% ether in hexane is crystallized from methylene chloride-hexane to give 6β-methyl-9α-chloro-11β-fluoroprogesterone.

EXAMPLE 27

6β-methyl-9α-iodo-11β-chloroprogesterone

To 500 mg. of 6β-methyl-4,9(11)-pregnadiene-3,20-dione (the compound of Example 24) dissolved in 25 ml. of diethylacetic acid, there is added 350 mg. of N-iodosuccinimide and 2 g. of lithium chloride followed by a solution of 55 mg. of hydrogen chloride in 2 ml. of tetrahydrofuran. The reaction mixture is stirred at room temperature for 5 hours, then is poured into an aqueous sodium carbonate solution. The mixture is extracted with methylene chloride and the organic extracts are combined and evaporated in vacuo at room temperature to a residue which is crystallized twice from acetone-hexane to give 6β-methyl-9α-iodo-11β-chloroprogesterone.

EXAMPLE 28

6α-methyl-4,9(11)-pregnadiene-3,20-dione (A) 6α-METHYL-11α-HYDROXYPROGESTERONE p-TOLUENESULFONATE A solution of 10 g. of 6α-methyl-11α-hydroxyprogesterone in 40 ml. of chloroform and 50 ml. of dry pyridine is chilled in ice and 12 g. of p-toluenesulfonyl chloride is added in small portions. The reaction mixture is stirred at 0° C. for 1 hour, then allowed to stand at room temperature for 18 hours. The mixture is then poured into ice-water, stirred thoroughly and extracted with chloroform. The organic solution is washed with water and concentrated in vacuo to a residue which is triturated with a small amount of methanol and filtered to give 6α-methyl-11α-hydroxyprogesterone p-toluenesulfonate, which is used without further purification in the next step.

(B) 6α-METHYL-4,9(11)-PREGNADIENE-3,20-DIONE

To a solution of 15 g. of anhydrous sodium acetate in 140 ml. of acetic acid, heated to about 110° C., is added 10 g. of the 11α-p-toluenesulfonate of Example 28A. The solution is refluxed for 30 minutes, then chilled in ice and diluted with cold water. A solid product forms which is filtered, washed with dilute acetic acid, dried at room temperature and crystallized from acetone-hexane to give 6α-methyl-4,9(11)-pregnadiene-3,20-dione.

EXAMPLE 29

6α-methyl-9α,11β-dichloroprogesterone

One gram of 6α-methyl-4,9(11)-pregnadiene-3,20-dione (the compound of Example 28) is chlorinated with 220 mg. of chlorine gas in carbon tetrachloride containing 0.65 ml. of pyridine in the manner described in Example 25. The product is isolated in the described manner and crystallized from acetone-hexane to give 6α-methyl-9α,11β-dichloroprogesterone.

Alternatively, the compound of this example is prepared as follows:

200 mg. of 6β-methyl-9α,11β-dichloroprogesterone (the compound of Example 25) in 10 ml. of a 2% solution of potassium hydroxide in 90% aqueous methanol is refluxed under nitrogen for 18 hours. The solution is poured into water. A solid separates which is filtered, washed with water and crystallized twice from acetone-hexane to give (6α-methyl-9α,11β-dichloroprogesterone.

EXAMPLE 30

6α-methyl-9α-bromo-11β-fluoroprogesterone

One gram of 6α-methyl-4,9(11)-pregnadiene-3,20-dione (the compound of Example 28) and 450 mg. of N-bromoacetamide is dissolved in 50 ml. of diethylacetic acid and there is added a solution of 500 mg. of hydrogen fluoride in 20 ml. of diethylacetic acid. The solution is stirred at room temperature for 2 hours, then poured into cold sodium carbonate solution and stirred for 15 minutes. A precipitate forms which is filtered and then dissolved in acetone-ether and filtered through a column of Florisil in ether. The product is eluted with ether the combined eluates distilled in vacuo and the resultant residue triturated with pentane-ether, then crystallized from methylene chloride-pentane to give 6α-methyl-9α-bromo-11β-fluoroprogesterone.

EXAMPLE 31

6α-methyl-9α-chloro-11β-fluoroprogesterone

In the manner described in Example 26, 6α-methyl-4,9(11)-pregnadiene-3,20-dione (the compound of Example 28) is reacted with N-chlorosuccinimide and hydrogen fluoride in diethylacetic acid. The product is isolated in the described manner and crystallized from methylene chloride-hexane and methylene chloride-pentane to give 6α-methyl-9α-chloro-11β-fluoroprogesterone.

Alternatively, the compound of this example is prepared by reacting 200 mg. of 6β-methyl-9α-chloro-11β-fluoroprogesterone (the compound of Example 26) with methanolic potassium hydroxide in the manner described in the alternative procedure of Example 29. The product is isolated in the described manner and crystallized from methylene chloride-hexane and methylene chloride-pentane to give 6α-methyl-9α-chloro-11β-fluoroprogesterone.

EXAMPLE 32

6α-methyl-9α-iodo-11β-chloroprogesterone

In the manner described in Example 27, 6α-methyl-4,9(11)-pregnadiene-3,20-dione (the compound of Example 28) is reacted with N-iodosuccinimide and hydrogen chloride in the presence of lithium chloride and the resultant product isolated and purified to give 6α-methyl-9α-iodo-11β-chloroprogesterone.

Alternatively, the compound of this example is prepared by reacting 6β-methyl-9α-iodo-11β-chloroprogesterone (the compound of Example 27) with methanolic potassium hydroxide in the manner described in the alternative procedure of Example 29 to give 6α-methyl-9α-iodo-11β-chloroprogesterone.

EXAMPLE 33

6α-methyl-9α11β-dibromoprogesterone

To a solution of 1 g. of 6α-methyl-4,9(11)-pregnadiene-3,20-dione (the compound of Example 28) and 4 g. of lithium bromide in 50 ml. of acetic acid, there is added 410 mg. of N-bromoacetamide followed by a solution of 240 mg. of hydrogen bromide in 5 ml. of acetic acid. The mixture is stirred at room temperature for one hour, then is poured into ice-water. A solid forms which is filtered, washed with water, then crystallized and recrystallized from acetone-hexane to give 6α-methyl-9α,11β-dibromoprogesterone.

EXAMPLE 34

6β-methyl-1,4,9(11)-pregnatriene-3,20-dione

Five grams of 6β-methyl-4,9(11)-pregnadiene-3,20-dione is fermented with *Corynebacterium simplex* (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 6β-methyl-4,9(11)-pregnadiene-3,20-dione (the compound of Example 1) in 5.0 ml. acetone is inoculated with the 24-hour culture of *Corynebacterium simplex* (A.T.C.C. 6946). The culture-containing steroid solution is incubated for 48 hours at 28–30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6β-methyl-1,4,9(11)-pregnatriene-3,20-dione.

EXAMPLE 35

6β-methyl-9α,11β-dichloro-1,4-pregnadiene-3,20-dione

6β-methyl-1,4,9(11)-pregnatriene-3,20-dione (the compound of Example 34) is chlorinated with chlorine gas in carbon tetrachloride in the presence of pyridine in the manner described in Example 25. The resultant product is isolated and purified in the described manner to give 6β-methyl-9α,11β-dichloro-1,4-pregnadiene-3,20-dione.

Alternatively, the compound of this example is prepared by subjecting 6β-methyl-9α,11β-dichloroprogesterone (the compound of Example 25) to the action of a culture of the microorganism *Corynebacterium simplex* by the procedure described in Example 34, and the resultant product isolated and purified to give 6β-methyl-9α,11β-dichloro-1,4,pregnadiene-3,20-dione.

A second alternate method of preparing this example is as follows. One gram of 6β-methyl-1,4,9(11)-pregnatriene-3,20-dione (the compound of Example 20) and 1 g. of p-iodotoluene dichloride are dissolved in 25 ml. of methylene chloride. The solution is stirred at room temperature for 5 hours, then concentrated in vacuo to a residue which is crystallized from acetone-hexane to give 6β-methyl-9α,11β-dichloro-1,4-pregnadiene-3,20-dione.

In like manner, the compounds of Examples 26 through 33, when subjected to the action of a culture of the microorganism *Corynebacterium simplex* (in the manner described in Example 34) are converted respectively to the following compounds:

6β-methyl-9α-chloro-11β-fluoro-1,4-pregnadiene-3,20-dione, 6β-methyl-9α-iodo-11β-chloro-1,4-pregnadiene 3,20-dione, 6α-methyl-1,4,9(11)-pregnatriene-3,20-dione, 6α-methyl-9α,11β-dichloro-1,4-pregnadiene-3,20-dione, 6α-methyl-9α-bromo-11β-fluoro-1,4-pregnadiene-3,20-dione, 6α-methyl-9α-chloro-11β-fluoro-1,4-pregnadiene-3,20-dione, 6α-methyl-9α-iodo-11β-chloro-1,4-pregnadiene-3,20-dione and 6α-methyl-9α,11β-dibromo-1,4-pregnadiene-3,20-dione.

Alternatively, 6α-methyl-1,4,9(11)-pregnatriene-3,20-dione, and 6β-methyl-1,4,9(11)-pregnatriene-3,20-dione (prepared as described in the above paragraph) are reacted with halogenating reagents and combinations of reagents in the manner described in preceding Examples 25 through 27, 29 through 33, and the resultant product isolated and purified to yield the corresponding 9α,11β-dihalogeno-derivatives which are listed in the above paragraph.

This application is a continuation in part of our copending applications, Serial Numbers 817,049, now abandoned, and 817,051, both filed on June 1, 1959.

We claim:

1. A compound of the group consisting of 6-W-9α-X-11β-Y-progesterones, 6-W-9*a*-X-11β-Y-19-norprogesterones and 6-W-9*a*-X-11β-Y-1-dehydroprogesterones wherein W is a member of the group consisting of hydrogen and methyl; X is a halogen having an atomic weight greater than 19; and Y is a halogen having an atomic weight less than 126 and being at least as electronegative as X.

2. 9α-X-11β-Y-6-methylprogesterone wherein X is a halogen having an atomic weight greater than 19; and Y is a halogen having an atomic weight less than 126 and being at least as electronegative as X.

3. 9α-X-11β-Y-6-methyl-1-dehydroprogesterone wherein X is a halogen having an atomic weight greater than 19; and Y is a halogen having an atomic weight less than 126 and being at least as electronegative as X.

4. 9α-X-11β-Y-progesterone wherein X is a halogen having an atomic weight greater than 19, and Y is a halogen having an atomic weight less than 126 and being at least as electronegative as X.

5. 9α-X-11β-Y-19-norprogesterone wherein X is a halogen having an atomic weight greater than 19, and Y is a halogen having an atomic weight less than 126 and being at least as electronegative as X.

6. 9α-X-11β-Y-1-dehydroprogesterone wherein X is a halogen having an atomic weight greater than 19, and Y is a halogen having an atomic weight less than 126 and being at least as electronegative as X.

7. 9α,11β-dichloroprogesterone.
8. 9α,11β-dichloro-19-norprogesterone.
9. 9α,11β-dichloro-1,4-pregnadiene-3,20-dione.
10. 9α-bromo-11β-fluoroprogesterone.
11. 9α-bromo-11β-fluoro-19-norprogesterone.
12. 9α-bromo-11β-fluoro-1,4-pregnadiene-3,20-dione.
13. 9α-bromo-11β-chloroprogesterone.
14. 9a-bromo-11β-chloro-19-norprogesterone.
15. 9α-bromo-11β-1,4-pregnadiene-3,20-dione.
16. 6α-methyl-9α,11β-dichloroprogesterone.
17. 6β-methyl-9α,11β-dichloroprogesterone.
18. 6α-methyl-9α,11β-dichloro-1-dehydroprogesterone.
19. 6β-methyl-9α,11β-dichloro-1-dehydroprogesterone.
20. 6α-methyl-9α-bromo-11β-fluoroprogesterone.

21. A compound of the structural formula:

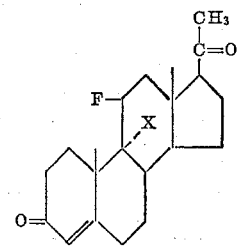

wherein X is a halogen having an atomic weight greater than 19.

No references cited.

PO-1050
(5/69)

UNITED STATES PATENT OFFICE
CERTIFICATE OF CORRECTION

Patent No. 3,009,927        Dated November 21, 1961

Inventor(s) H. Reimann and D. H. Gould

It is certified that error appears in the above-identified patent and that said Letters Patent are hereby corrected as shown below:

Column 15, claim 15, reading "9α-bromo-11β-1,4-pregnadiene-3,20-dione." should read ---9α-Bromo-11β-chloro-1,4-pregnadiene-3,20-dione.---.

SIGNED AND
SEALED
JUN 30 1970

(SEAL)
Attest:

Edward M. Fletcher, Jr.
Attesting Officer

WILLIAM E. SCHUYLER, JR.
Commissioner of Patents